INVENTOR
Willie J. Walker,

BY
McMorrow, Berman + Davidson
ATTORNEYS

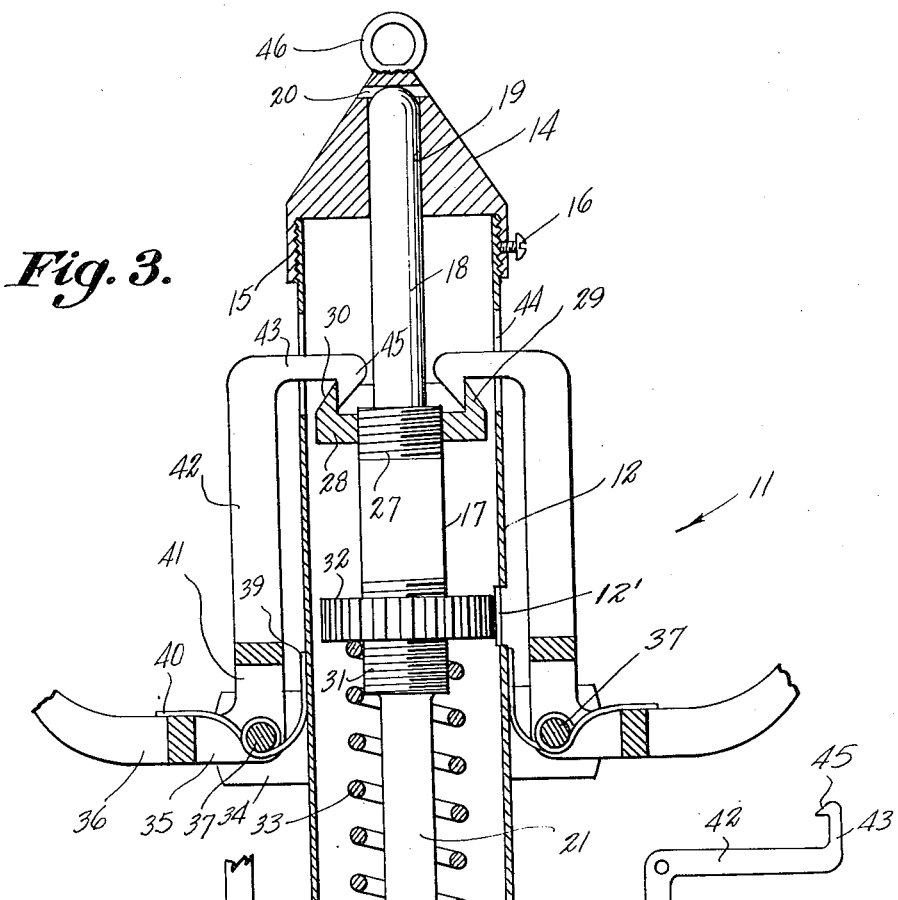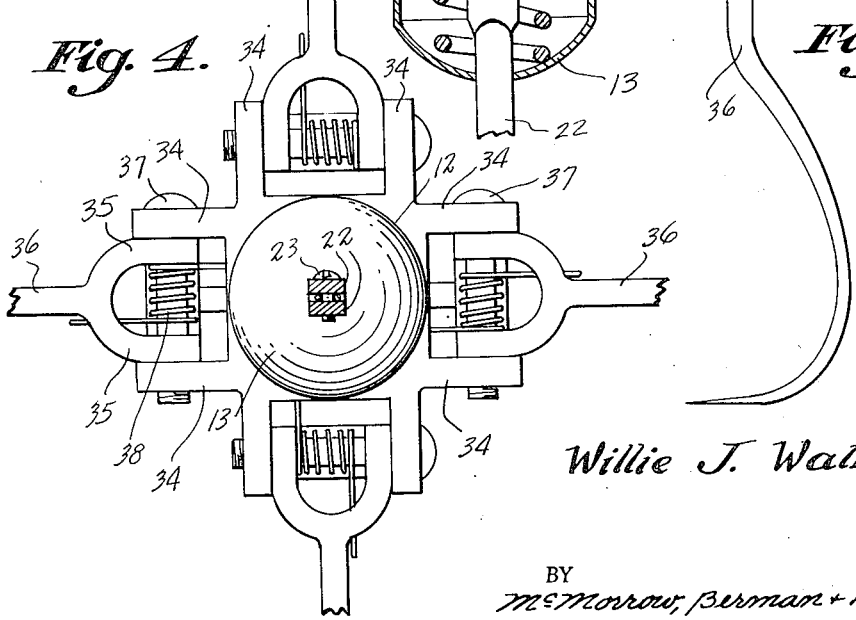

2,770,065
FISHING APPARATUS

Willie James Walker, Phenix City, Ala.

Application April 16, 1954, Serial No. 423,680

3 Claims. (Cl. 43—89)

This invention relates to apparatus for catching fish, and more particularly to an improved trap device which is arranged to carry bait to attract fish, the bait carrying means being arranged to release the main trap elements of the device when pulled.

A main object of the invention is to provide a novel and improved apparatus for catching fish or small animals, said apparatus being simple in construction, being easy to set, and being adjustable in accordance with the size of the animals or fish to be caught.

A further object of the invention is to provide an improved apparatus for trapping fish or small animals, said apparatus involving inexpensive components, being sturdy in construction, being safe to handle, and being reliable in operation.

Further objects and advantages of the invention will become apparent from the following description and claims, and from the accompanying drawings, wherein:

Figure 3 is an enlarged vertical cross sectional view taken through the central portion of the device of Figure 1.

Figure 4 is a enlarged horizontal cross sectional view taken on the line 4—4 of Figure 1.

Figure 5 is a detail side elevational view of one of the hook elements employed in the device of Figures 1 to 4.

Figure 1:
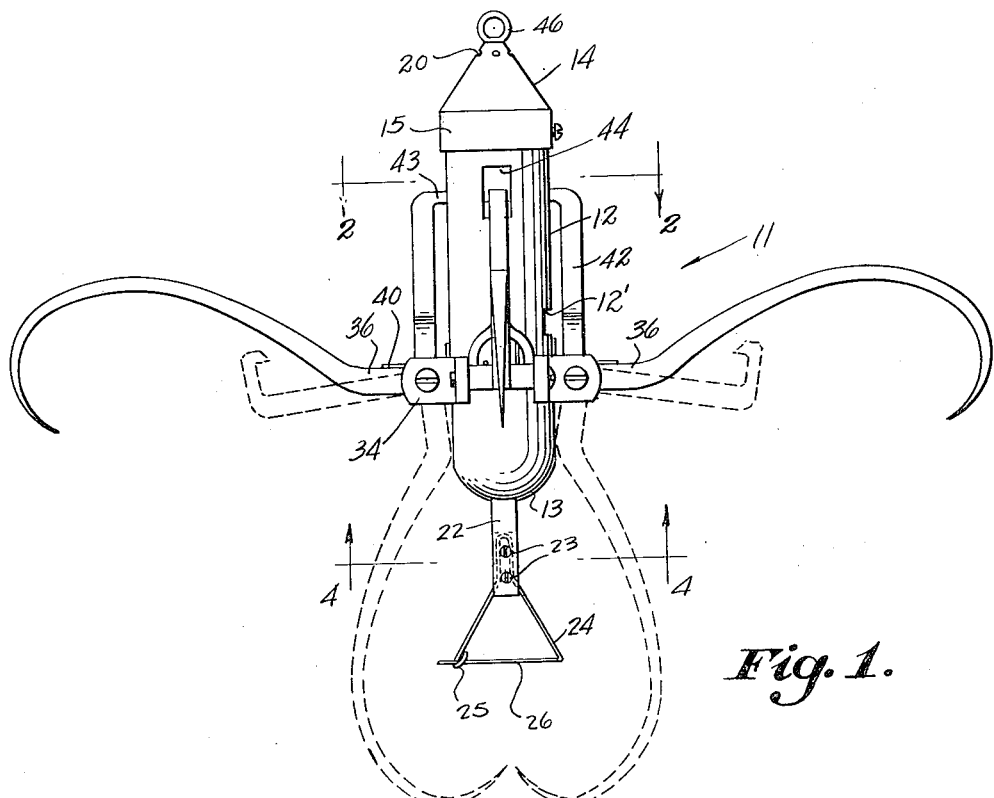
Figure 1 is a side elevational view of an improved trap device constructed in accordance with the present invention.

Referring to the drawings, the trap device is designated generally at 11 and comprises a tubular main body 12 having a downwardly convex bottom wall 13 and provided at its top end with the conical cover 14, said cover having the internally threaded peripheral flange 15 which is threadedly engageable on the top end of the tubular main body 12. Designated at 16 is a set screw provided in the flange 15, which when tightened, locks the cover 14 on the top end of the tubular body 12.

Designated at 17 is a plunger member having the reduced top portion 18 which extends slidably through a bore 19 formed axially in the conical cover member 14, the top end of the cover member 14 being provided with the transverse vent bore 20 communicating with the bore 19 and allowing the plunger stem 18 to slide freely in said bore. The plunger 17 is provided with the reduced lower portion 21 having the parallel depending rectangular fingers 22, 22 extending slidably through the bottom wall 13 of body 12. Secured between the fingers 22, 22, as by clamping screws 23, 23 is the depending triangular bait carrier 24, which may comprise a piece of wire bent to triangular shape and formed at one corner with the hook 25 which releasably retains the bait-engaging arm 26 of the carrier. The arm 26 is resiliently engaged in the hook 25 and may be disengaged therefrom, as when a quantity of bait material is engaged on the arm 26, after which said arm may be reengaged lockingly in the hook 25, whereby the bait is supported below the fingers 22, 22.

The intermediate portion of the plunger 17 is formed with the upper threads 27 on which is threadedly engaged the collar 28, said collar being formed with the upstanding, annular detent rib 29. As shown in Figure 3, the rib 29 is tapered upwardly at its outer surface 30.

The lower portion of the intermediate section of plunger 17 is formed with the threads 31 on which is threadedly engaged the collar element 32. Designated at 33 is a coiled spring which surrounds the reduced lower portion 21 of the plunger 17 and bears between the collar 32 and the bottom wall 13 of body 12, biasing the plunger upwardly. The amount of biasing force on the plunger 17 may be adjusted by adjusting the position of the collar 32 on the threads 31, access to the collar 32 being obtained through the aperture 12' formed in the tubular body 12.

Figure 2:
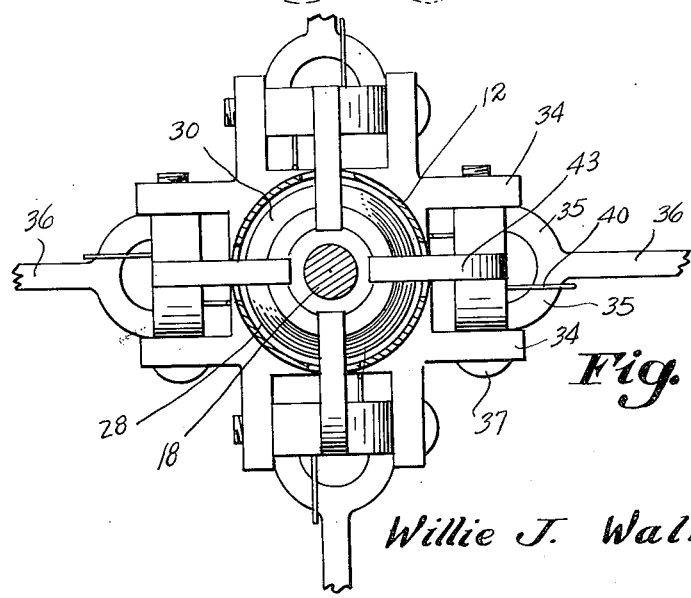
Figure 2 is an enlarged horizontal cross sectional view taken on line 2—2 of Figure 1.

The body 12 is formed with the respective pairs of parallel vertical lugs 34, 34, arranged on opposite sides of the body 12, as illustrated in Figures 2 and 4, and pivoted between each pair of lugs 34, 34 are the arms 35, 35 integrally formed on the end of a hook member 36. As shown in Figures 1 to 4, the hook members 36 are swingable towards each other, and are arranged in opposing relationship. The arms 35, 35 are connected to the respective lugs 34, 34 by respective pivot bolts 37 extending through the lugs 34 and arms 35. Engaged on each pivot bolt 37 between the associated arms 35, 35 is a coiled spring 38 having one end thereof engaging the body 12, as shown at 39, and having the other end thereof engaging the upper surface of the associated hook 36, as shown at 40, whereby the hooks are biased downwardly towards each other. As shown in Figure 3, the arms 35 are formed with the extension portions 41 projecting at right angles to the associated hook 36 and merging with a catch arm 42 which projects substantially at right angles to the associated hook 36 and which is formed at its free end with a hooked finger 43. The upper portion of the body 12 is formed with the vertical slots 44 through which the respective hooked fingers 43 are extensible, said hooked fingers having the detent elements 45 at their ends which are lockingly with means on the plunger or collar 28 carrying the rib 29, the ends of the detent elements 45 being engageable inside the peripheral flange or rib 29 on the collar 28. Thus, the hooks 36 may be arranged in the manner shown in Figure 1, with the hooks in outwardly spread positions and the detent fingers 43 engaged inside the peripheral rib 29. It will be readily apparent that a downward pull exerted on the plunger 17, as, when an animal attempts to pull the bait carried on the carrier 24, will cause the collar 28 to move downwardly and disengage from the hooked detent fingers 43, releasing the hooks and allowing the springs 38 of the hooks to rotate said hooks inwardly towards each other. The fish or small animal may thus be trapped by said hooks.

The top end of the cover member 14 is provided with an eye element 46, whereby the device may be attached to the end of a line, enabling said device to be lowered into the water. The device is set by placing a quantity of bait on the arm 26 of the bait carrier, in the manner above described, and then spreading the hooks outwardly to engage their hooked detent fingers 43 with the rib 29 on the collar 28. The device may then be lowered into the water. When a fish attempts to obtain the bait, as above described, the downward pull exerted on the plunger 17 causes the hooks to be released and causes the biasing springs 38 thereof to rotate the hooks inwardly towards each other and thereby catch the fish.

The device may be employed in a similar manner for snaring small animals, the tension on the spring 33 being adjustable, as above described, by changing the position of the collar 32 on the enlarged intermediate portion of plunger 17. Since the collar 28 is threaded on the upper portion of the enlarged intermediate section of the plunger, the plunger may be adjusted vertically relative to the housing 12 in accordance with the particular game to be snared.

In using the device for trapping small animals, said device may be hung from any suitable support, as, for example, from the branch of a tree.

While a specific embodiment of an improved trap device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a trap device, a tubular main body having a bottom wall, a pair of hooks pivoted to opposite sides of said body in opposing relationship and being swingable towards each other, spring means biasing said hooks toward each other, a plunger mounted for axial sliding movement in said main body, with the lower end of said plunger extending through said bottom wall and projecting axially from said body, a bait carrier secured to said lower end, respective catch arms on said hooks extending into said body and being lockingly engageable with means on said plunger when the hooks are in spread apart positions, guide means on the top end of said main body slidably receiving the upper end of said plunger, a collar element threadedly engaged on the plunger, said main body being formed with an aperture providing access to said collar element, and a coil spring surrounding said plunger and bearing between said collar element and said bottom wall, biasing said plunger toward said catch arms, the plunger being disengageable from said means on said plunger responsive to an outward axial pull on said bait carrier, whereby the hooks are swung toward each other by said spring means.

2. In a trap device, a tubular main body having a bottom wall, a pair of hooks pivoted to opposite sides of said body in opposing relationship and being swingable toward each other, spring means biasing said hooks toward each other, a plunger mounted for axial sliding movement in said main body, the lower end of said plunger extending through said bottom wall and projecting axially from said body, a bait carrier secured to said lower end, respective catch arms on said hooks, a first collar element on said plunger, an annular detent rib on said first collar element, said catch arms being engageable with said rib to hold the hooks spread apart, guide means on the top end of said main body slidably receiving the upper end of said plunger, a second collar element threadedly engaged on the plunger, said main body being formed with an aperture providing access to said second collar element for adjustment of the same, and a coil spring surrounding said plunger and bearing between said second collar element and said bottom wall, biasing said plunger toward each catch arm, the rib being disengageable from said catch arms responsive to an outward axial pull on said bait carrier, whereby the hooks are swung toward each other by said spring means.

3. In a trap device, a tubular main body having a bottom wall, a plurality of pairs of hooks pivoted to opposite sides of said body in opposing relationship and being swingable toward each other, spring means biasing said hooks toward each other, a plunger mounted for axial sliding movement in said main body, the lower end of said plunger extending through said bottom wall and projecting axially from said body, a bait carrier secured to said lower end, respective hooked catch arms on said hooks, a first collar element on said plunger, an annular detent rib on said first collar element, said catch arms being engageable with said rib to hold the hooks spread apart, guide means on the top end of said main body slidably receiving the upper end of said plunger, a second collar element threadedly engaged on the plunger, said main body being formed with an aperture providing access to said second collar element for adjustment of the same, and a coil spring surrounding said plunger and bearing between said second collar element and said bottom wall, biasing said plunger toward said catch arms, the rib being disengageable from said catch arms responsive to an outward axial pull on said bait carrier, whereby the hooks are swung toward each other by said spring means, said body being formed with apertures through which said catch arms are extensible to engage with said rib.

References Cited in the file of this patent

UNITED STATES PATENTS

| | | |
|---|---|---|
| 589,640 | Cartier | Sept. 7, 1897 |
| 633,081 | Daugherty | Sept. 12, 1899 |
| 911,781 | Timmons | Feb. 9, 1909 |
| 1,387,735 | Payne | Aug. 16, 1921 |
| 1,466,620 | Guy | Aug. 28, 1923 |